US012678903B2

(12) United States Patent
Woo

(10) Patent No.: US 12,678,903 B2
(45) Date of Patent: Jul. 14, 2026

(54) APPARATUS FOR EXCHANGING A TOOL OF A BORING BAR AND METHOD OF EXCHANGING A TOOL OF A BORING BAR USING THE SAME

(71) Applicant: DN SOLUTIONS CO., LTD., Changwon-si (KR)

(72) Inventor: Jingeun Woo, Changwon-si (KR)

(73) Assignee: DN CO., LTD., Changwon-si (KR)

( * ) Notice: Subject to any disclaimer, the term of this patent is extended or adjusted under 35 U.S.C. 154(b) by 328 days.

(21) Appl. No.: 17/913,133

(22) PCT Filed: Mar. 23, 2020

(86) PCT No.: PCT/KR2020/003919
§ 371 (c)(1),
(2) Date: Sep. 20, 2022

(87) PCT Pub. No.: WO2021/193986
PCT Pub. Date: Sep. 30, 2021

(65) Prior Publication Data
US 2023/0191548 A1 Jun. 22, 2023

(51) Int. Cl.
*B23Q 3/155* (2006.01)
*B23Q 3/157* (2006.01)
(52) U.S. Cl.
CPC ...... *B23Q 3/15503* (2016.11); *B23Q 3/15506* (2013.01); *B23Q 2003/15537* (2016.11);
(Continued)
(58) Field of Classification Search
CPC ............. Y10T 483/10; Y10T 483/1707; Y10T 483/1712; Y10T 483/1736;
(Continued)

(56) References Cited

U.S. PATENT DOCUMENTS 3,601,886 A * 8/1971 Gohren .............. B23Q 3/15506
483/26
6,149,561 A * 11/2000 Beecherl ............ B23Q 3/15706
483/30
(Continued)

FOREIGN PATENT DOCUMENTS

CN 201346715 Y * 11/2009
CN 202556120 U * 11/2012
(Continued)

OTHER PUBLICATIONS

International search report of PCT/KR2020/003919, Dec. 21, 2020, English translation.
(Continued)

*Primary Examiner* — Sunil K Singh
*Assistant Examiner* — Michael Vitale
(74) *Attorney, Agent, or Firm* — STIP Law Group, LLC

(57) ABSTRACT

An apparatus for exchanging a tool of a boring bar may include a magazine, a frame, a guide rail and an actuator. The magazine may be configured to receive a plurality of the tools. The frame may be arranged under the magazine. The guide rail may be arranged on the frame. The magazine may be movably connected to the guide rail. The actuator may be configured to rotate the magazine. Thus, the magazine configured to hold the tools may be arranged between the main shaft and the spindle exchanging apparatus to reduce a weight of the tool.

10 Claims, 5 Drawing Sheets

(52) U.S. Cl.
CPC ......... *B23Q 3/15722* (2016.11); *Y10T 483/10* (2015.01); *Y10T 483/1736* (2015.01); *Y10T 483/1882* (2015.01)

(58) Field of Classification Search
CPC . Y10T 483/1738; Y10T 483/179–1795; Y10T 483/1873; Y10T 483/1882; B23Q 3/15503; B23Q 3/15706; B23Q 2003/15537
USPC ..... 483/1, 19, 21, 31, 32, 54, 55, 56, 66, 67
See application file for complete search history.

(56) References Cited

U.S. PATENT DOCUMENTS

| | | | | |
|---|---|---|---|---|
| 9,227,245 | B2 * | 1/2016 | Tsai ........................... | B23B 5/00 |
| 11,014,206 | B2 * | 5/2021 | Moroff .............. | B23Q 3/15706 |
| 2004/0005973 | A1 * | 1/2004 | Momochi .......... | B23Q 3/15553 483/31 |
| 2005/0137069 | A1 * | 6/2005 | Ueda ................. | B23Q 3/15526 483/27 |
| 2005/0143236 | A1 * | 6/2005 | Nakazawa ......... | B23Q 3/15536 483/54 |
| 2009/0036282 | A1 | 2/2009 | Yasuda et al. | |
| 2015/0057139 | A1 * | 2/2015 | Canuto .............. | B23Q 3/15536 483/65 |
| 2015/0266149 | A1 * | 9/2015 | Komatsu ............ | B23Q 3/15713 483/36 |
| 2017/0066094 | A1 * | 3/2017 | Hoshi ..................... | B23B 41/02 |
| 2017/0304973 | A1 * | 10/2017 | Koizumi ............ | B23Q 3/15526 |
| 2022/0168858 | A1 * | 6/2022 | Choi ................. | B23Q 3/15503 |

FOREIGN PATENT DOCUMENTS

| | | | | |
|---|---|---|---|---|
| CN | 104959865 | A | * | 10/2015 |
| DE | 102005043399 | A1 | | 3/2007 |
| EP | 0169543 | B1 | | 3/1991 |
| JP | 63062629 | A | * | 3/1988 |
| JP | H0429336 | U | | 3/1992 |
| JP | 2003080408 | A | | 3/2003 |
| JP | 3908495 | B2 | * | 4/2007 |
| JP | 2009178804 | A | * | 8/2009 |
| KR | 100750594 | B1 | | 8/2007 |
| KR | 100779805 | B1 | | 11/2007 |
| KR | 20090037734 | A | | 4/2009 |
| KR | 101850759 | B1 | | 6/2018 |
| KR | 20200106658 | A | | 9/2020 |
| WO | WO-2019135561 | A1 | * | 7/2019 |

OTHER PUBLICATIONS

The extended European search report of EP 20 92 7746, Nov. 22, 2023.

* cited by examiner

FIG. 5

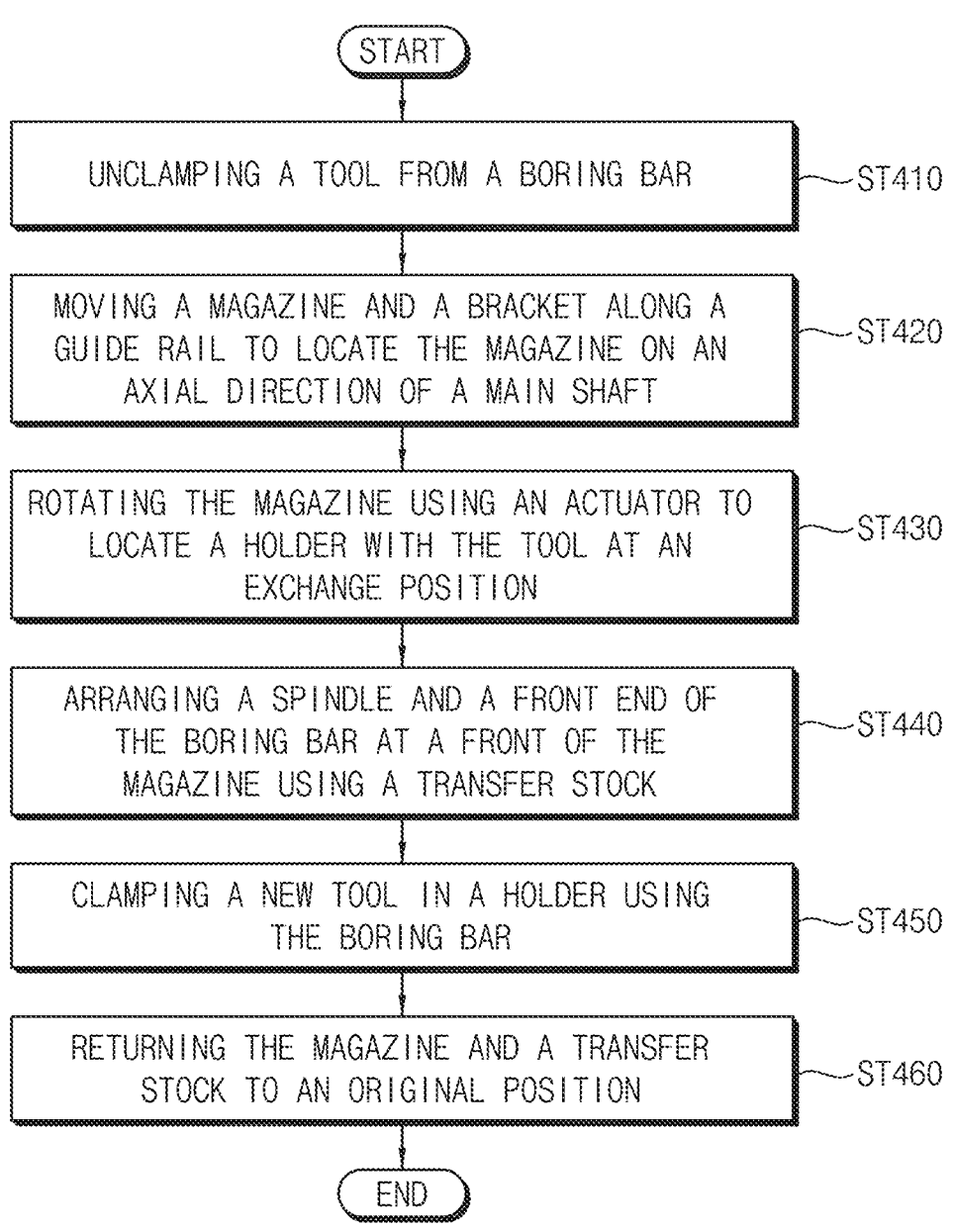

START

UNCLAMPING A TOOL FROM A BORING BAR —ST410

MOVING A MAGAZINE AND A BRACKET ALONG A GUIDE RAIL TO LOCATE THE MAGAZINE ON AN AXIAL DIRECTION OF A MAIN SHAFT —ST420

ROTATING THE MAGAZINE USING AN ACTUATOR TO LOCATE A HOLDER WITH THE TOOL AT AN EXCHANGE POSITION —ST430

ARRANGING A SPINDLE AND A FRONT END OF THE BORING BAR AT A FRONT OF THE MAGAZINE USING A TRANSFER STOCK —ST440

CLAMPING A NEW TOOL IN A HOLDER USING THE BORING BAR —ST450

RETURNING THE MAGAZINE AND A TRANSFER STOCK TO AN ORIGINAL POSITION —ST460

END

APPARATUS FOR EXCHANGING A TOOL OF A BORING BAR AND METHOD OF EXCHANGING A TOOL OF A BORING BAR USING THE SAME

CROSS-REFERENCE TO RELATED APPLICATIONS

This application is the U.S. National Phase under 35 U.S.C. § 371 of International Application No. PCT/KR2020/003919 filed on Mar. 23, 2020, the disclosures of which are incorporated by reference into the present application.

BACKGROUND

1. Field

Example embodiments relate to an apparatus for exchanging a tool of a boring bar and a method of exchanging a tool of a boring bar using the same. More particularly, example embodiments relate to an apparatus for exchanging a tool installed at a front end of a long boring bar to machine a workpiece, and a method of exchanging a tool of a boring bar using the apparatus.

2. Description of the Related Art

Generally, a boring machine may be used for precisely machining a hole of a long workpiece. The boring machine may include a boring bar having a long length configured to enter into an inner surface of the hole of the long workpiece. A tool for machining the inner surface of the hole may be installed at a front end of the boring bar. Further, the boring machine may include an apparatus for exchanging the tool for a new tool.

According to related arts, the exchanging apparatus may have a structure commonly used with a spindle exchanging apparatus. Thus, the tool installed at the front end of the boring bar may have a size substantially the same as a size of a tool installed at a spindle. In order to improve a performance of a damper in the boring machine, it may be required to reduce a weight of the tool at the front end of the boring bar. However, because the tool at the spindle may not have a vibration damping function, the tool may have a large size so that the tool at the front end of the boring bar may also have a large size.

In a type for exchanging a tool using a swing arm, a fixing force corresponding to the weight of the tool may be provided to the swing arm to prevent a falling of the tool. The fixing force may impact the boring bar having a long overhang in an exchanging process. Further, the swing arm may have long X-Y axis strokes due to a distance difference between the spindle and the boring bar regardless of a size of the workpiece for the exchanging process. When a large space for the swing arm may not be secured, the size of the workpiece may be restricted due to interference between the workpiece and the spindle.

SUMMARY

Example embodiments provide an apparatus for exchanging a tool of a boring bar that may be capable of reducing a weight of the tool installed at a front end of the boring bar.

Example embodiments also provide a method of exchanging a tool of a boring bar using the above-mentioned apparatus.

According to example embodiments, there may be provided an apparatus for exchanging a tool of a boring bar. The apparatus may include a magazine, a frame, a guide rail and an actuator. The magazine may be configured to receive a plurality of the tools. The frame may be arranged under the magazine. The guide rail may be arranged on the frame. The magazine may be movably connected to the guide rail. The actuator may be configured to rotate the magazine.

In example embodiments, the magazine may include a rotation plate rotated by the actuator and a plurality of holders arranged on an outer surface of the rotation plate to hold the tools.

In example embodiments, the magazine may be rotated with respect to an axial direction of the boring bar.

In example embodiments, the guide rail may be extended in a direction substantially perpendicular to a rotation shaft of the magazine.

In example embodiments, the apparatus may further include a cylinder arranged at the frame to move the magazine along the guide rail.

In example embodiments, the apparatus may further include a bracket movably connected to the guide rail. The magazine may be rotatably connected to the bracket. The actuator may be installed at the bracket.

In example embodiments, the actuator may include a servo motor.

In example embodiments, the magazine may be arranged between a spindle exchanging apparatus and a spindle configured to fix a workpiece machined by the boring bar.

According to example embodiments, there may be provided a method of exchanging a tool of a boring bar. In the method of exchanging the tool of the boring bar, a magazine may be arranged on an axial direction of a main shaft of the boring machine. A plurality of holder configured to hold a plurality of the tools may be installed at the magazine. The magazine may be rotated to locate a holder holding a new tool at an exchange position. The boring with the tool may be arranged at a front of the boring bar. The tool may be exchanged for the new tool.

In example embodiments, arranging the magazine on the axial direction of the main shaft may include horizontally moving the magazine along a guide rail.

In example embodiments, the method may further include returning the magazine to an original position after exchanging the tool for the new tool.

According to example embodiments, the magazine configured to hold the tools may be arranged between the main shaft and the spindle exchanging apparatus to reduce a weight of the tool. Thus, a damper may have a vibration damping capacity to decrease an impulse generated in exchanging the tool. Further, the tool may be exchanged for the new tool regardless of a size of a workpiece.

BRIEF DESCRIPTION OF THE DRAWINGS

Example embodiments will be more clearly understood from the following detailed description taken in conjunction with the accompanying drawings.

FIGS. 1 to 5 represent non-limiting, example embodiments as described herein.

FIG. 1 is a perspective view illustrating a boring machine with a tool exchanging apparatus in accordance with example embodiments;

FIG. 2 is an enlarged perspective view illustrating the tool exchanging apparatus in FIG. 1;

FIG. 3 is a perspective view illustrating an operation of the tool exchanging apparatus in FIG. 1;

FIG. 4 is a front view illustrating the tool exchanging apparatus in FIG. 3; and FIG. 5 is a flow chart illustrating a method of exchanging a tool of a boring bar using the apparatus in FIG. 1.

DETAILED DESCRIPTION OF THE EMBODIMENTS

Figure 1:
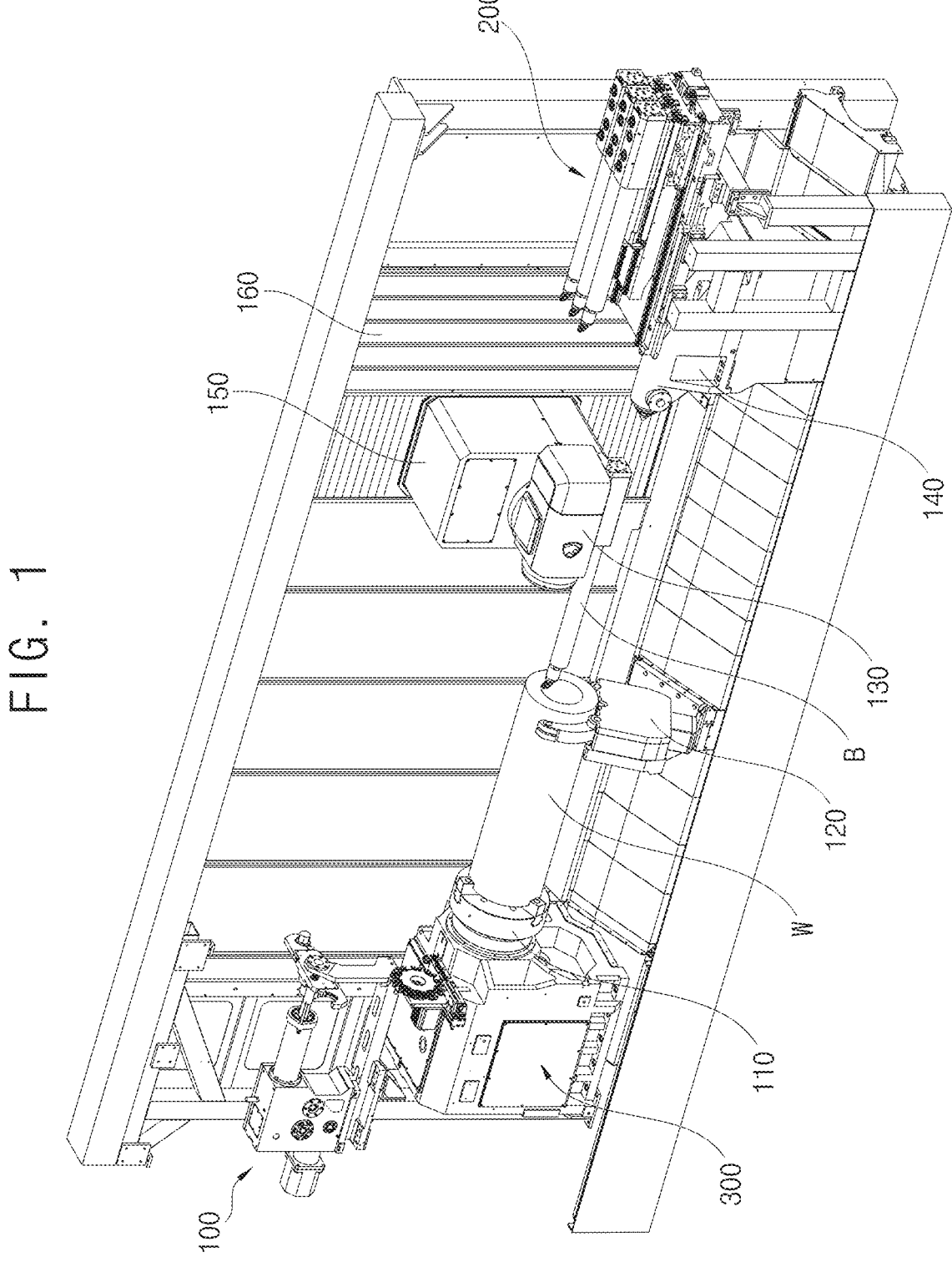

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a perspective view illustrating a boring machine with a tool exchanging apparatus in accordance with example embodiments.

Referring to FIG. 1, a boring machine may include a main shaft 110, a vibration isolator 120, a spindle 130, a tail stock 140, a transfer stock 150, a spindle exchange apparatus 100, a boring bar storage apparatus 200 and a tool exchange apparatus 300.

The main shaft 110 may be horizontally arranged to fix a one end of a workpiece W. The workpiece W may have a long pipe shape having a hole. The vibration isolator 120 may support the other end of the workpiece W to prevent a vibration of the workpiece W.

The spindle 130 may be transferred by the transfer stock 150. The transfer stock 150 may transfer the spindle 130 in horizontal and vertical directions. A boring bar B may be fixed to a lower end of the transfer stock 150. The boring bar B may machine an inner surface of the hole of the workpiece W. The boring bar B may have a bar shape having a long length. The tail stock 140 may support an end of the boring bar B fixed to the lower end of the transfer stock 150.

The spindle exchange apparatus 100 may be arranged on an end of the main shaft 110. The spindle exchange apparatus 100 may exchange the spindle 130 for a new spindle. The spindle exchange apparatus 100 may be arranged in a direction substantially parallel to an axial direction of the main shaft 110.

The boring bar storage apparatus 200 may be arranged over the tail stock 140. A door 160 may be arranged between the boring bar storage apparatus 200 and the spindle 130. The boring bar storage apparatus 200 may store a plurality of new boring bars B. The boring bar storage apparatus 200 may forward to the transfer stock 150 to exchange the boring bar B fixed to the transfer stock 150 for the new boring bar B.

Figure 2:
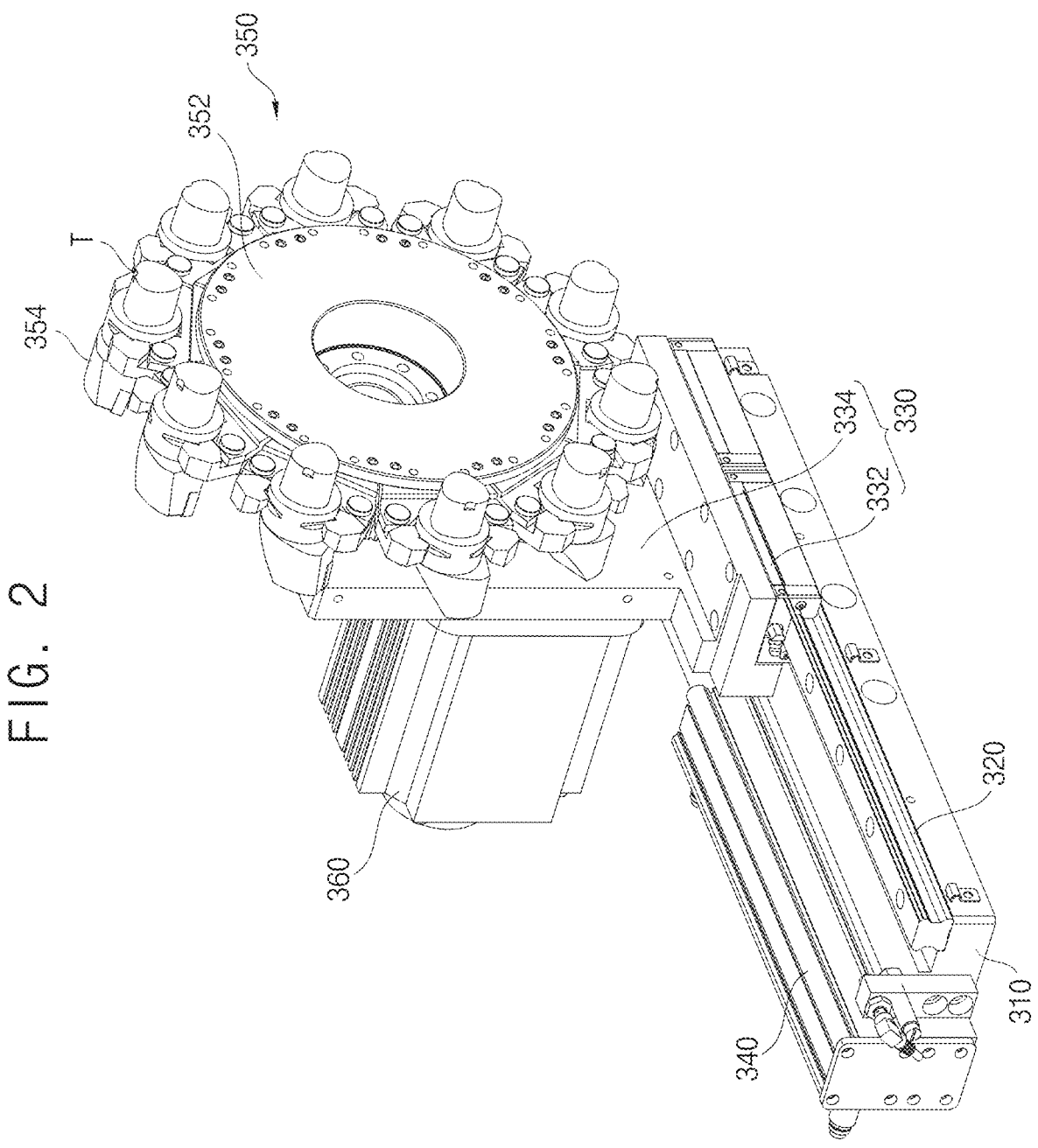
Figure 3:
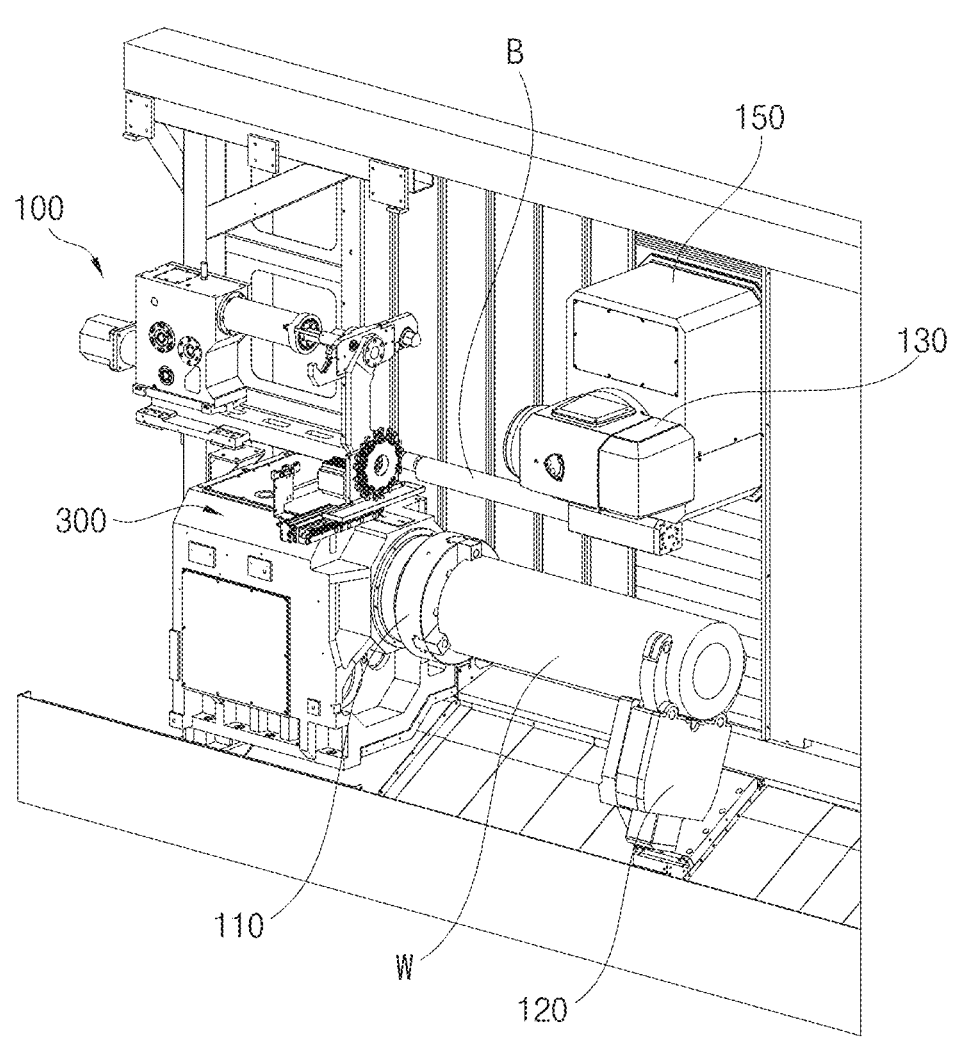
Figure 4:
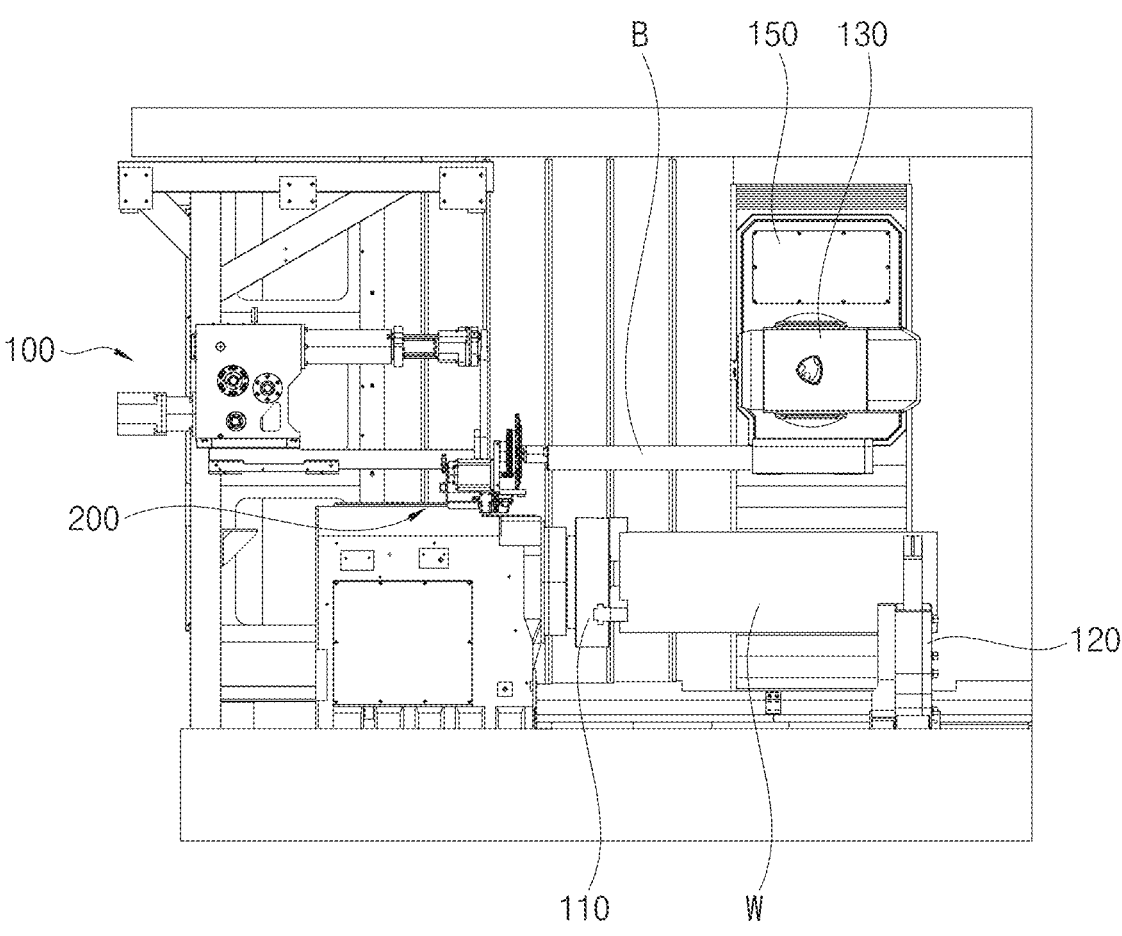

FIG. 2 is an enlarged perspective view illustrating the tool exchanging apparatus in FIG. 1, FIG. 3 is a perspective view illustrating an operation of the tool exchanging apparatus in FIG. 1 and FIG. 4 is a front view illustrating the tool exchanging apparatus in FIG. 3.

Referring to FIGS. 2 to 4, the tool exchange apparatus 300 may exchange a tool T installed at a front end of the boring bar B for a new tool T. The tool exchange apparatus 300 may be arranged between the main shaft 110 and the spindle exchange apparatus 100. The tool exchange apparatus 300 may include a frame 310, a guide rail 320, a bracket 330, a cylinder 340, a magazine 350 and an actuator 360.

The frame 310 may be arranged between the main shaft 110 and the spindle exchange apparatus 100. The frame 310 may be extended in a direction substantially perpendicular to the axial direction of the main shaft 110. The guide rail 320 may be arranged on an upper surface of the frame 310. The guide rail 320 may be extended in the direction substantially perpendicular to the axial direction of the main shaft 110.

The bracket 330 may be movably connected to the guide rail 320. The bracket 330 may include a slider 332 and a supporting plate 334. The slider 332 may be movably connected to the guide rail 320. The supporting plate 334 may be arranged on an upper surface of the slider 332. The slider 332 may be moved along the guide rail 320 to move the bracket 330 along the direction substantially perpendicular to the axial direction of the main shaft 110.

The cylinder 340 may be installed at the upper surface of the frame 310. The cylinder 340 may provide the bracket 330, particularly, the slider 332 with a straight movement force in the direction substantially perpendicular to the axial direction of the main shaft 110. Thus, the slider 332 may be moved along the guide rail 320 by the straight movement force provided from the cylinder 340.

The magazine 350 may be arranged on a first surface of the supporting plate 334 of the bracket 330, i.e., a front surface of the supporting plate 334 oriented toward the spindle 130. The magazine 350 may include a rotation plate 352 and a plurality of holder 354. The rotation plate 352 may be rotatably connected to the supporting plate 352 with respect to the axial direction of the main shaft 110. The holders 354 may be arranged on an outer surface of the rotation shaft 352. The holders 352 may be configured to hole the tools T. A holder 352 with the tool T to be exchanged among the holders 354 may be positioned at an exchange position by the rotation of the rotation plate 352.

The actuator 360 may be installed at a second surface of the supporting plate 334 opposite to the first surface. The actuator 360 may rotate the rotation shaft 352 of the magazine 350 with respect to the axial direction of the main shaft 110. In example embodiments, the actuator 360 may include a servo motor.

FIG. 5 is a flow chart illustrating a method of exchanging a tool of a boring bar using the apparatus in FIG. 1.

Referring to FIGS. 1 and 5, in step ST410, the tool T may be unclamped from the boring bar B. Particularly, the boring bar B with the tool T may be moved forwardly to the exchange position. The magazine 350 may be moved to hold the tool T. The boring bar B may then be moved backwardly to unclamp the tool T from the boring bar B.

In step ST420, the cylinder 340 may move forwardly the bracket 330 along the guide rail 320 to position the bracket 330 on the axial direction of the main shaft 110.

In step ST430, the actuator 360 may rotate the magazine 350 to locate the holder 352 with the tool T to be exchanged at the exchange position.

In step ST440, the transfer stock 150 may be moved toward the magazine 350. Thus, the spindle 130 may be moved to the front of the magazine 350 to locate the front end of the boring bar B at the front of the holder 352.

In step ST450, the boring bar B may clamp the new tool T in the holder 352. Particularly, the boring bar B may be moved forwardly to clamp the new tool T in the holder 352. The magazine 350 may be moved to release the new tool T from the magazine 350. Thus, the boring bar B may clamp the new tool T.

After exchanging the tool T, in step ST460, the cylinder 340 may move backwardly the bracket 330 along the guide rail 320 to return the bracket 330 at the original position. The transfer stock 150 may also be returned to an original position so that the spindle 130 and the boring bar B may be returned to a machining position.

According to example embodiments, the magazine configured to hold the tools may be arranged between the main shaft and the spindle exchanging apparatus to reduce a weight of the tool. Thus, a damper may have a vibration damping capacity to decrease an impulse generated in exchanging the tool. Further, the tool may be exchanged for the new tool regardless of a size of a workpiece.

The foregoing is illustrative of example embodiments and is not to be construed as limiting thereof. Although a few example embodiments have been described, those skilled in the art will readily appreciate that many modifications are possible in the example embodiments without workpiece departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A machine tool comprising:
   a boring bar configured to receive a tool for machining a workpiece;
   a magazine configured to store the tool for machining the workpiece;
   a spindle configured to be movable in a same direction as the boring bar;
   a transfer stock configured to transfer the boring bar and the spindle, the boring bar fixed to a lower end of the transfer stock;
   a boring bar storage apparatus configured to store the boring bar when the boring bar is to be exchanged;
   a frame arranged under the magazine with respect to a vertical direction;
   a guide rail arranged on the frame, wherein the magazine is connected to the guide rail and wherein a longitudinal axis of the guide rail extends in a lateral direction perpendicular to the vertical direction such that the magazine moves along the guide rail in the lateral direction;
   an actuator configured to rotate the magazine; and a main shaft configured to fix the workpiece and rotate the workpiece so as to machine the workpiece, wherein a longitudinal center axis of the main shaft and a longitudinal center axis of the workpiece are aligned with one another so as to be concentric, wherein a longitudinal direction extends perpendicular to the lateral direction and perpendicular to the vertical direction, the magazine and the guide rail are positioned, with respect to the longitudinal direction, in their respective entireties, on a first side of the main shaft, and when the boring bar is machining the workpiece with the tool, the boring bar and the boring bar storage apparatus are positioned, with respect to the longitudinal direction, in their respective entireties, on an opposing second side of the main shaft.

2. The machine tool of claim 1, wherein the magazine comprises:

a rotation plate rotated by the actuator; and a plurality of holders arranged at an outer surface of the rotation plate, each of the plurality of holders capable of holding the tool.

3. The machine tool of claim 1, wherein the magazine is rotated with respect to the longitudinal direction.

4. The machine tool of claim 1, further comprising:

a cylinder installed at the frame to move the magazine along the guide rail.

5. The machine tool of claim 1, further comprising:

a bracket movably connected to the guide rail, the magazine being rotatably connected to the bracket, and the actuator being installed at the bracket.

6. The machine tool of claim 1, wherein the actuator comprises a servo motor.

7. The machine tool of claim 1, wherein the magazine is arranged between a spindle exchanger and the main shaft.

8. A method of exchanging a tool of a boring bar using the machine tool of claim 1, the method comprising:

providing the machine tool of claim 1;

arranging the magazine, which includes a plurality of holders configured to store tools, along the lateral direction;

rotating the magazine to locate one of the plurality of holders with a new tool at an exchange position;

arranging the boring bar attached with the tool at a front of the magazine; and exchanging the tool attached to the boring bar for the new tool.

9. The method of claim 8, wherein arranging the magazine comprises moving the magazine along the guide rail.

10. The method of claim 8, further comprising:

returning the magazine to an original position along the guide rail after exchanging the tool attached to the boring bar for the new tool.

* * * * *